United States Patent
Foster et al.

(10) Patent No.: US 7,941,840 B2
(45) Date of Patent: May 10, 2011

(54) SECURE RESOURCE ACCESS

(75) Inventors: Ward Scott Foster, Boise, ID (US); Robert John Madril, Jr., Boise, ID (US); Shell Sterling Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2419 days.

(21) Appl. No.: 10/373,990

(22) Filed: Feb. 25, 2003

(65) Prior Publication Data

US 2004/0168082 A1 Aug. 26, 2004

(51) Int. Cl.
*G06F 9/00* (2006.01)
*G06F 7/04* (2006.01)
*G06F 21/00* (2006.01)

(52) U.S. Cl. ............... 726/14; 726/17; 726/27; 713/185
(58) Field of Classification Search ................ 726/4, 17, 726/27, 14; 713/185, 168
See application file for complete search history.

(56) References Cited

U.S. PATENT DOCUMENTS

| | | | |
|---|---|---|---|
| 6,339,423 B1 * | 1/2002 | Sampson et al. | 715/854 |
| 6,453,353 B1 * | 9/2002 | Win et al. | 709/229 |
| 6,917,976 B1 * | 7/2005 | Slaughter et al. | 709/226 |
| 6,985,946 B1 * | 1/2006 | Vasandani et al. | 709/225 |
| 7,225,256 B2 * | 5/2007 | Villavicencio et al. | 709/225 |
| 7,231,661 B1 * | 6/2007 | Villavicencio et al. | 709/229 |
| 2002/0147813 A1 * | 10/2002 | Teng et al. | 709/225 |
| 2002/0165960 A1 * | 11/2002 | Chan | 709/225 |
| 2002/0178366 A1 * | 11/2002 | Ofir | 713/182 |
| 2002/0184357 A1 * | 12/2002 | Traversat et al. | 709/223 |
| 2002/0194483 A1 * | 12/2002 | Wenocur et al. | 713/185 |
| 2003/0056092 A1 * | 3/2003 | Edgett et al. | 713/153 |
| 2003/0105862 A1 * | 6/2003 | Villavicencio | 709/225 |
| 2003/0208684 A1 * | 11/2003 | Camacho et al. | 713/186 |
| 2004/0054916 A1 * | 3/2004 | Foster et al. | 713/200 |
| 2004/0162871 A1 * | 8/2004 | Pabla et al. | 709/201 |
| 2005/0022006 A1 * | 1/2005 | Bass et al. | 713/201 |

* cited by examiner

Primary Examiner — Techane J Gergiso

(57) ABSTRACT

A method, computer readable media, and system for providing a first network resource with secure but limited access to a second network resource. A method embodiment of the invention includes associating a check with data identifying an expected source of a future request to access the second resource. Later, the first resource requests access to the second resource. Included in the request is a check signed with data identifying the first resource. The request is received and the check is authenticated. The request is granted only if the check is authentic and the data used to sign the check matches the expected source associated with the check.

19 Claims, 6 Drawing Sheets

| 46 | 48 | 50 | 52 | 54 |
|---|---|---|---|---|
| CHECK | EXPECTED SOURCE | PUBLIC KEY | EXPIRATION CRITERIA | ACCESS PERMISSION CRITERIA |
| qwerty | www.application(1).com | key(1) | 20:14:00 | 1 |
| asdfg | www.application(2).com | key(2) | 20:15:30 | 3 |
| ... | ... | ... | ... | ... |
| zxcvb | www.application(n).com | key(n) | 1 use | 2 |

DATABASE 36

SECURE RESOURCE ACCESS

FIELD OF THE INVENTION

The present invention is directed to accessing a distributed resource. More particularly, the invention is directed to providing secure but limited access to a resource in a distributed environment.

BACKGROUND OF THE INVENTION

In a basic desktop computing environment, a computer, accessing data from its hard drive, performs a specified function such as word processing, displaying information on a screen, and, when requested, producing a document on a connected printer. In a distributed computing environment, the resources found in the desktop environment are spread across any number of interconnected devices. For example, a client accesses a resource over the Internet. Accessing data provided by the client or located and retrieved from another device, the resource performs specified tasks. These tasks include, among a multitude of others, manipulating the data as instructed, returning the data for use by the client, and/or sending data to a printer for production.

The following provides a more specific example of a distributed computing system utilized to print documents. A client computer, utilizing a web browser and the Internet, accesses a web server providing a document printing resource. The web server may be running on a device connected to or networked with one or more printers. Alternatively, the web server may be embedded in the printer itself. The printing resource locates available printers and a data resource managing electronic documents. The printing service then returns to the browser a graphical interface containing user accessible controls for selecting a document from the data resource as well as controls for selecting a printer. Selections made through the interface are returned to the printing resource. Accessing the data resource, the printing resource retrieves and/or sends the selected document to the selected printer for production.

Accessing distributed resources raises a number of security considerations. Access to a resource may be limited for commercial or privacy purposes. Using the example above, a user may be a paid subscriber enabling access to the printing resource. The user may pay a flat rate or may pay for each use. For commercial security, the user may be required to present credentials such as a user name and password in order to access the printing resource. The same may be true for the data resource. However, presenting credentials to the data resource also promotes user privacy. A user may store documents on the data resource that the user desires to keep private and secure.

Consequently, granting one resource access to another resource compounds the security considerations. Using the example above, a user presents one set of credentials to access the printing resource. The user then provides the printing resource with a second set of credentials needed to access the data resource. Here lies the problem. Conventional communication techniques such as Secure Hypertext Protocol provide the user reasonable assurance that third parties cannot intercept credentials being passed. However, the user has no assurance that the printing resource will not again access the data resource using the provided credentials without the user's consent or knowledge.

SUMMARY

Accordingly, the present invention is directed to a method, computer readable media, and system for providing a first network resource with secure but limited access to a second network resource. A method embodiment of the invention includes associating a check with data identifying an expected source of a future request to access the second resource. Later, the first resource requests access to the second resource. Included in the request is a check signed with data identifying the first resource. The request is received and the check is authenticated. The request is granted only if the check is authentic and the data used to sign the check matches the expected source associated with the check.

DESCRIPTION OF THE DRAWINGS

FIG. 4 is a table illustrating entries and fields in the security module database according to an embodiment of the present invention.

DETAILED DESCRIPTION OF THE INVENTION

Figure 1:
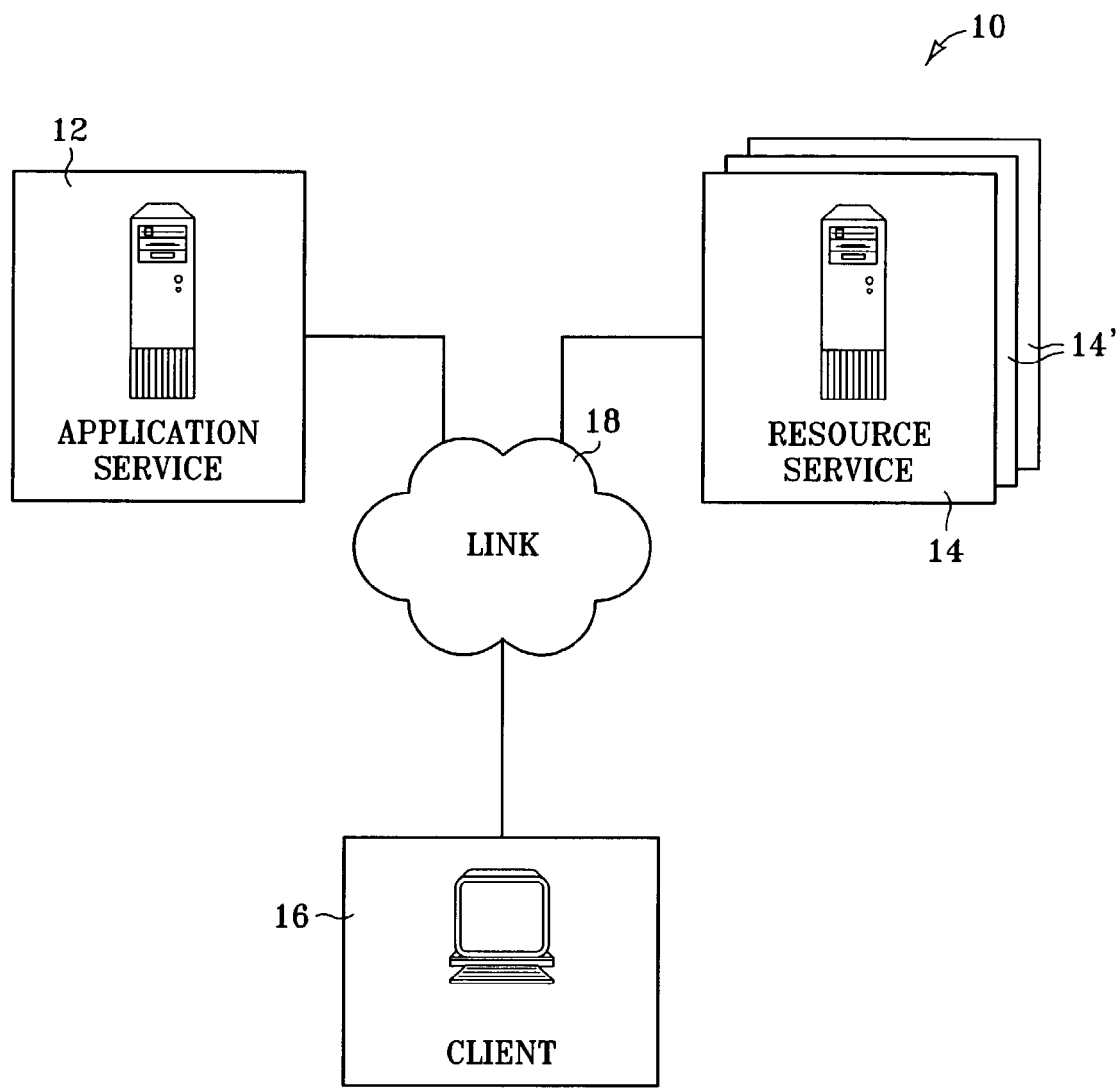
FIG. 1 is a schematic representation of a computer network in which various embodiments of the present invention may be incorporated.

GLOSSARY:

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Client-Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for acting on the client request and returning requested information, if any, back to the client. This requested information may be an electronic file such as a word processing document or spread sheet, a web page, or any other electronic data to be displayed or used by the client. In any given network there may be multiple clients and multiple servers. A single device may contain programming allowing it to operate both as a client device and as a server device. Moreover, a client and a server may both operate on the same device.

Web Server: A server that implements HTTP (Hypertext Transport Protocol). A web server can host a web site or a web service. A web site provides a user interface by supplying web pages to a requesting client, in this case a web browser. Web pages can be delivered in a number of formats including, but not limited to, HTML (Hyper-Text Markup Language) and XML (extensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface which may be exposed using a variety of protocols layered on top of HTTP—for example, SOAP (Simple Object Access Protocol).

Interface: The junction between a user and a computer program providing commands or menus through which a user communicates with the program. The term user in this context represents generally any individual or mechanism desiring to communicate with the program. For example, in the client-server model defined above, the server usually generates and delivers to a client an interface for communicating with a program operating on or controlled by the server device. Where the server is a web server, the interface is a web page. The web page, when displayed by the client device, presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

INTRODUCTION: In a distributed computing environment, a user employs a client to access a particular application running on a server device. The user directs the application to manipulate a resource located and operating anywhere on a computer network. To do so, the user must provide the application with the information required to locate and securely access the resource. It is expected that various embodiments of the present invention will enable the provision of this information with minimal user interaction while maintaining the user's security and privacy.

Although the various embodiments of the invention disclosed herein will be described with reference to the computer network 10 shown schematically in FIG. 1, the invention is not limited to use with network 10. The invention may be implemented in or used with any computer system in which it is necessary or desirable to access electronic data. The following description and the drawings illustrate only a few exemplary embodiments of the invention. Other embodiments, forms, and details may be made without departing from the spirit and scope of the invention, which is expressed in the claims that follow this description.

Referring to FIG. 1, computer network 10 represents generally any local or wide area network in which a variety of different electronic devices are linked. Network 10 includes application service 12, resource service 14, and client 16 all interconnected by link 18. Application service 12 represents generally any combination of programming and/or hardware capable of distributing an application over network 10. Resource service 14 represents any combination of hardware and/or programming capable of providing a resource to a distributed application. Client 16 represents any combination of hardware and/or programming capable of interacting with application service 12 and resource service 14. Network 10 may also include one or more additional resource services 14.

Link 18 interconnects devices 12-16 and represents generally a cable, wireless, or remote connection via a telecommunication link, an infrared link, a radio frequency link, or any other connector or system that provides electronic communication between devices 12-16. Link 18 may represent an intranet, an Internet, or a combination of both. Devices 12-16 can be connected to the network 10 at any point and the appropriate communication path established logically between the devices.

COMPONENTS: The logical components of one embodiment of the invented data access system will now be described with reference to the block diagram of FIG. 2. Application service 12 includes application 20, application server 22, and resource module 24. Application 20 represents generally any programming capable of being distributed over network 10. For example, application 20 may be a document production service or a remote document management service. Application server 22 represents generally any programming capable of distributing application 20. Application server 22 is also capable of generating or otherwise providing a session interface to be displayed by client 16 enabling a user to interact with application 20. Resource module 24 represents generally any programming capable of identifying and interacting with resource service 14.

Resource service 14 includes resource 26, resource server 28, and security module 30. Resource 26 represents generally any programming capable of being accessed and utilized over network 10. For example, where application 20 is a document production service, resource 26 may be a remote document management service. Resource server 28 represents any programming capable of making resource 26 available over network 10. Security module 30 represents any programming capable of limiting access to resource 26 to those providing verifiable credentials.

It is expected that servers 22 and 28 will be web servers. Application 20 and resource 26, then, may be web sites, web services, or a combination of the two. Client 16 contains browser 32 capable of communicating with servers 22 and 28. Servers 22 and 28 may also be accessed or communicated with programmatically—not using browser 32. For example, resource module 24 represents programming capable of communicating with resource server 28 at the direction of client 16.

Figure 3:
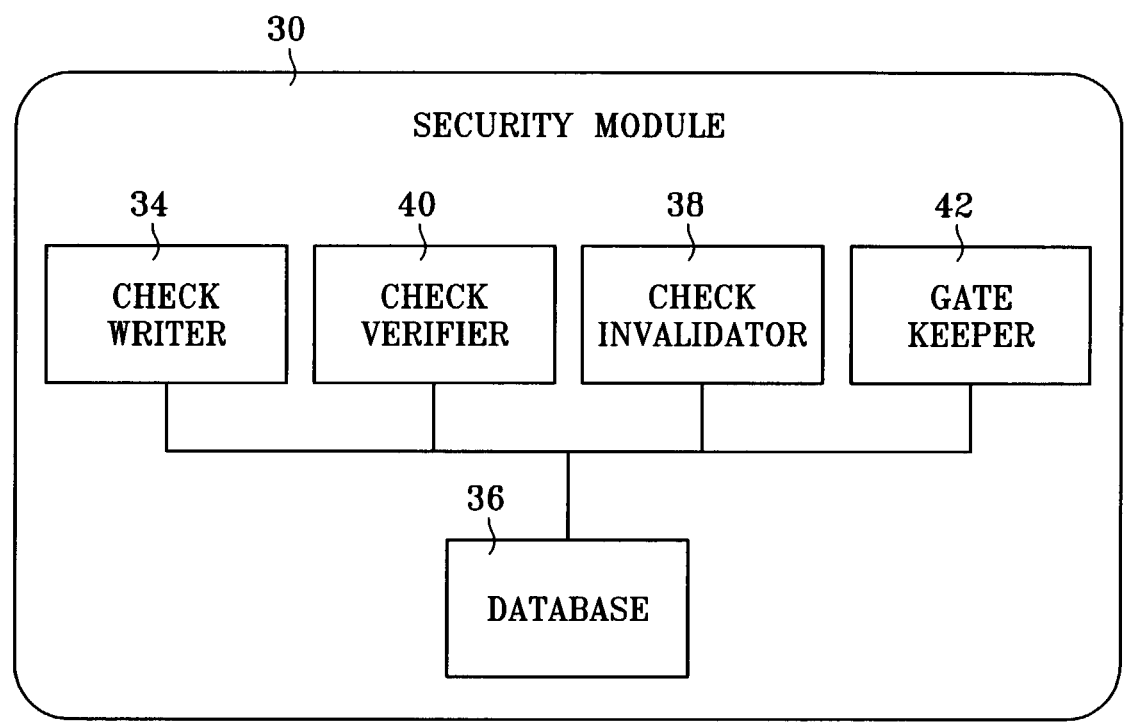
FIG. 3 is a block diagram illustrating the logical components of the security module of FIG. 2 according to an embodiment of the present invention.

Referring now to FIG. 3, security module 30 includes check writer 34, database 36, check invalidator 38, check verifier 40, and gate keeper 42. As its name indicates, check writer 34 represents generally any programming capable of producing checks in response to requests from client 16. A check is a unique piece of electronic data to be presented when requesting access to resource 26. For example, a check may be an alphanumeric string of a specified length. It is expected that a check generated by check writer 34 will be distinct from all other checks generated. Check writer 34 is also responsible for storing a copy of each generated check in database 36 where it can associate the copy with data identifying an expected source of a future request to access resource 26—in this case application service 12. Check writer 34 may also associate the copy with information relating to the use of a generated check such as criteria relating to how long the check is valid or to the allowable level of access to resource 26 specified by the check.

Check invalidator 38 represents generally any programming capable of detecting the occurrence of a termination event and invalidating a check accordingly. It is expected that a termination event or events for a particular check will be dictated by criteria associated with a copy of the check in database 36. Criteria associated with a copy of a check may, for example, indicate that the check expires fifteen minutes, an hour, or a day after being generated by check writer 34. A termination event for that check occurs when the specified time passes. To invalidate the check following the termination event, check invalidator 38 might delete the copy of the check from database 36, or it might associate the copy with data indicating that the check has expired.

Check verifier 40 represents generally any programming capable of authenticating a check presented with a request to access resource 26. To do so it is expected that check verifier 40 will locate a copy of the received check in database 36 and ensure that it has not been invalidated. Check verifier 40 also identifies the source of the request and compares the identity of the source with the data identifying an expected source that is associated with the located copy. A check is authenticated only if a valid copy of the check exists in database 36. Gate keeper 42 represents generally any programming capable of granting a request to access resource 26 only where the request is accompanied by an authentic check and the identified source of the request is the same as the expected source.

FIG. 4 is a table illustrating the logical contents of database 36. Database 36 contains a number of entries 44. Each entry 44 contains a number of fields 46-54. For a given entry 44, check field 46 contains a copy of a check generated by check writer 34. Expected source field 48 contains data identifying the expected source of a request to access resource 26. Public key field 50 contains the public encryption key for the expected source. Expiration criteria field 52 contains expiration criteria for the check in field 46. Expiration criteria may indicate that the check expires at a certain time or that a check is valid for a specified number of uses. Permission criteria field 54 contains permission criteria for the check in field 46. Permission criteria indicate the level of access to resource 26 to be granted to the expected source. For example, an access level of one may allow access to all features of resource 26. Other access levels then permit varying degrees of access to features of resource 26. Where resource 26 facilitates remote file storage, permission criteria may indicate the types of files that may be viewed and or retrieved from resource 26. Where resource 26 facilitates document production, permission criteria may indicate whether features such as duplex printing are allowed.

Figure 2:
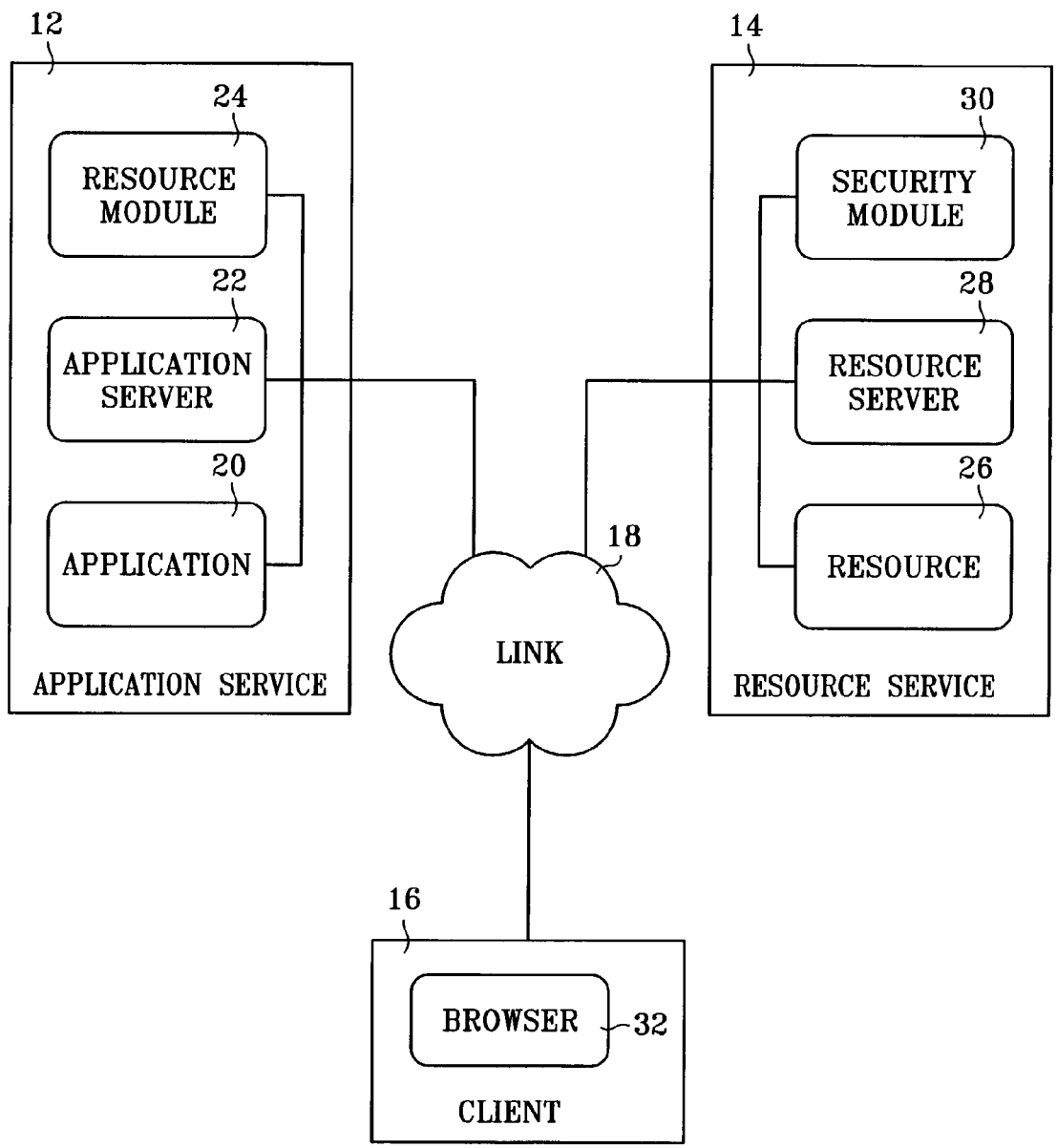
FIG. 2 is a block diagram of the network of FIG. 1 illustrating the logical program components operating on each device according to an embodiment of the present invention.

The block diagrams of FIGS. 2 and 3 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s). While application service 12 and resource service 14 are shown as distinct components of network 10, both may operate as a single component. Moreover, individual elements of application service 12 and resource service 14 may be found on more than one device.

Also, the present invention can be embodied in any computer-readable media for use by or in connection with an instruction execution system such as a computer/processor based system or other system that can fetch or obtain the logic from the computer-readable media and execute the instructions contained therein. A "computer-readable medium" can be any medium that can contain, store, or maintain programs and data for use by or in connection with the instruction execution system. The computer readable medium can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Figure 5:
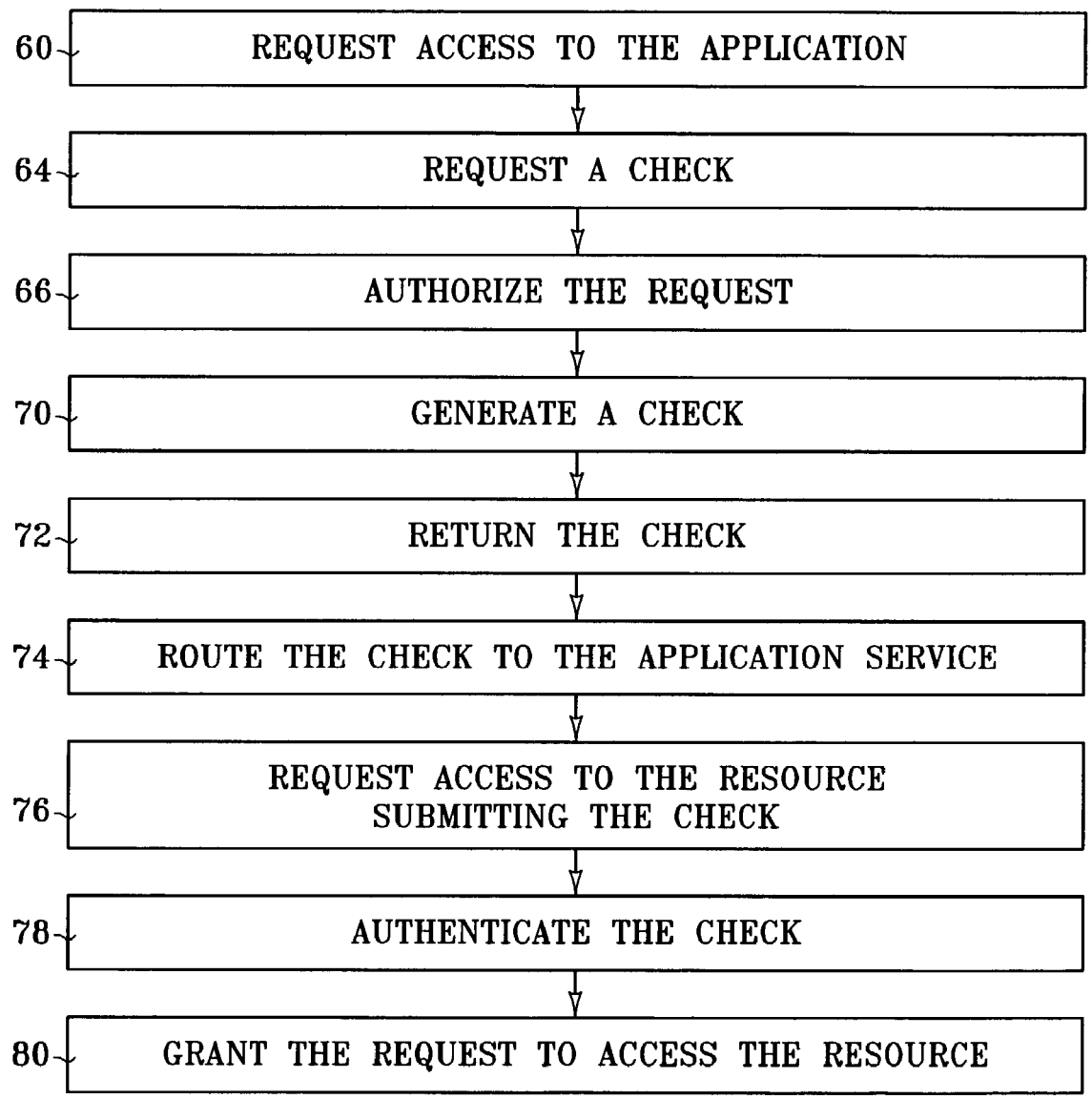
FIG. 5 is a flow diagram illustrating steps taken to access the resource according to an embodiment of the present invention.

OPERATION: The operation of the invented resource access method will now be described with reference to the flow diagram of FIG. 5. FIG. 5 illustrates steps taken to enable application service 12 to obtain access to resource 26.

Initially, client 16 requests access to application service 12 (step 60). Typically, this involves browsing to a network address established for application server 22. Application server 22 receives the request and, in response, returns an interface for interacting with application 20 and for identifying resource service 14. A check is requested from resource service 14 (step 64). Included with the check request is data identifying application service 12 as well as a public encryption key for application service 12. Because of the security restraints that prevent browser 32 from making arbitrary network connections, step 64 may be accomplished by an API (Application Program Interface) provided by browser 32 (or a programming extension to browser 32) on client 16. In this case, the check request may also include credentials such as a user name and password pair needed to gain access to resource service 14. Credentials may also take the form of a cookie. Alternatively, application service 12 may make the check request on behalf of client 16.

Resource service 14 authorizes the check request (step 66). Where the check request was made through browser 32, resource service 14 authorizes the request by authenticating credentials provided with the request. Where the check request was made by application service 12, the following steps occur. First, resource service 14 maps or associated an identifier with the public encryption key and data identifying resource service 14 and returns the identifier to application service 12. Application service 12 then provides client 16 with the identifier and redirects client 16 to resource service 14 causing client 16 to provide the identifier. It is expected that redirection will involve redirecting browser 32 to an URL (Uniform Resource Locator) for accessing resource service 14 and that URL will contain the identifier. When redirected, browser 32 requests access to resource service 14 using the URL. Resource service 14 receives the request and parses the identifier from the URL. Using the identifier, resource service 14 identifies application service 12 and provides client 16 with an interface containing data informing a user that application service 12 would like to access resource service 14 as well as controls allowing the user to approve or disapprove and controls or other means for providing credentials. Again, the credentials can take many forms such as a username and password pair or a cookie. Authorizing the check in step 66 is then accomplished by receiving a user's approval and authenticating the credentials.

Resource service 14—more particularly—check writer 34 then generates a check (step 70). Check writer 34 also generates a new entry 44 in database 36. The new entry 44 contains a copy of the generated check along with the data identifying application service 12 and the public encryption key provided along with the request for the check. Check writer 34 may also set permission and expiration criteria for the check reflected in fields 52 and 54 of the new entry 44.

Resource server 28 returns the check to client 16 (step 72) and redirects client 16 to application service 12 causing client 16 to provide the check to application service 12 (step 74). It is expected that redirection will involve redirecting browser 32 to an URL (Uniform Resource Locator) for accessing application service 12 and that URL will contain the check.

When redirected, browser 32 requests access to application service 14 using the URL. Resource service 14 receives the request and parses the identifier from the URL. Resource module 24 requests access to resource 26 presenting the check along with data identifying application service 12 (step 76). To do so, it is expected that resource module 24 will sign the check using a digital certificate identifying application service 12. Resource server 28 receives the request and forwards the check to security module 30. Check verifier 40, then, authenticates the check (step 78). In doing so, check verifier 40 locates an entry 44 in database 36 containing a copy of the check and verifies that the check has not been invalidated. Check verifier 40 also compares the expected source identifier 48 from the located entry 44 with the data identifying application service 12 provided with the request to access resource 26. If the check is valid and the identities match, gate keeper 42 grants the request to access resource 26 (step 80).

Providing access to resource 26, resource server 28 then encrypts a response to the access request of step 76 using the public encryption key 50 from the database entry 44 located following step 78. Since the response (and any data contained therein) is encrypted using the public encryption key 50, only application service 12 can decrypt and make use of this data since only application service 12 has the private encryption key that matches public encryption key 50. The level of access granted is determined by the permission criteria 54 found in that database entry 44. As the process illustrated in FIG. 5 unfolds, check invalidator 38 continually scans database 36 invalidating checks according to expiration criteria 52 found in each entry 44.

Figure 6:
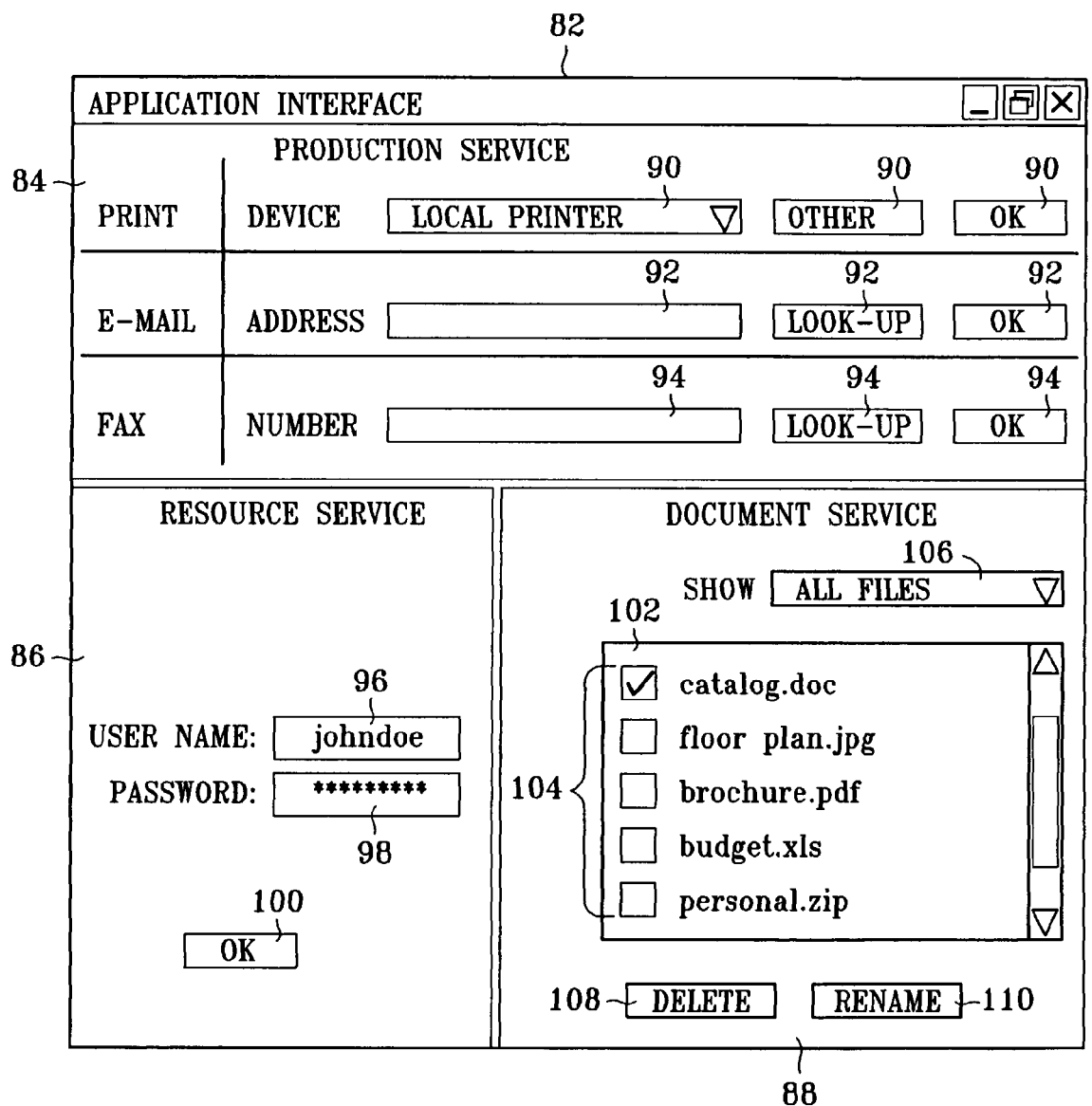
FIG. 6 is an exemplary screen view of an interface for producing electronic documents.

FIG. 6 is an exemplary screen view of an interface in the form of a framed web page 82 returned in step 62. A framed web page is one that divides the browser's display area into two or more sections or frames. The actual content of each frame is not provided by the framed web page itself. Rather, the framed web page provides, for each frame, a network address for accessing content to be displayed in that frame. The use of a framed web page in this example is for convenience only. The framed web wage may be separated into individual windows. The contents of two of the frames can be combined.

In this example, application 20 is a network resource providing document production services while resource 26 is a network resource providing remote document management. Web page 82 includes first frame 84, second frame 86, and third frame 88. First frame 84 contains controls for interacting with application 20. Second frame 86 contains controls for presenting user credentials to resource service 14. Third frame 88 contains controls for selecting and managing electronic documents managed by resource 26. The content for second frame 86 is provided by resource service 14 following a request for a check in step 64. The content for third frame 88, while requested after client 16 opens the interface in step 64, is not provided until a check presented by application service 12 in step 76 is authenticated in step 78. Resource service 14 may provide the content in third frame 88 indirectly through application service 12. That content may also be augmented by application service 12.

First frame 84 includes controls 90-94 for printing, e-mailing, and faxing a document or documents selected in third frame 88. Using controls 90, a user can instruct application 20 to print a selected document. Using controls 92 or 94, the user can instruct application 20 to send the selected document to a particular e-mail address or fax the document to a particular number.

Second frame 86 includes controls 96-100 enabling a user to manually provide user credentials. Controls 96 and 98 enable the user to enter a user name and password while control 100 allows the user to instruct client 16 to present or return the user credentials to resource service 14. It may be desirable to present the content of second frame 86 in a separate window. Using a separate window allows the user to see that they are communicating directly with resource service 14 rather than application service 12. This enforces the appearance that applications service 12 will not be able to gain unauthorized access to resource service 14 on the user's behalf.

Third frame 88 includes a scroll menu 102 displaying electronic documents managed by resource 26. In this example scroll menu 102 includes check boxes 104 allowing the user to select one or more of the displayed documents. Here, the document "catalog.doc" has been selected. Also included is pull down menu 106 and command buttons 108 and 110. Pull down menu 106 allows a user to select the type of files displayed in scroll menu 102. In this example "all files" is selected. A user may, however, desire to show only word processor documents or spreadsheets. Command buttons 108 and 110 allow a user to perform tasks such as deleting or renaming documents selected in scroll menu 102.

Through web page 82, a user enters production options for producing a selected document. Client 16 returns the user's selections directing application 20 to produce the selected document accordingly. Application server 22 receives the directions and instructs client 16 to refresh second frame 86. In response, client 16 once again requests a check from resource service 14. Resource server 28 receives the request, acquires the user's credentials, and returns a new check to client 16. Client 16 then routes the new check to application service 12 which signs and provides the new check with a request to retrieve the selected document from resource 26. Resource server 28 receives the request and forwards the check to security module 30 for authentication. Once the check is authenticated, resource 26 retrieves the selected document. Resource server 28, then, encrypts the document using the public key for application service 12 and returns the encrypted document for production.

Following a termination event, application service 12 must acquire and present a new check in order to access resource 26. It is expected that check invalidator 38 will invalidate a check once it has been used to access resource 26. In this way, application service 12 must acquire and present a new check each time it attempts to access resource 26. Because checks are obtained through client 16, beneficially, application service 12 cannot access resource 26 without the user's knowledge or at least implicit consent.

Although the flow chart of FIG. 5 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention. The screen display of FIG. 6 is exemplary only. There exist many possible layout and control configurations for interfaces that will allow a user to interact with application 20 and resource 26. FIG. 6 merely provides one such example.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. In a computer network, a method for granting a request from a first resource to access a second resource, comprising:
   associating, by a computing device, a check with data identifying an expected source of a future request to access the second resource;
   receiving, by computing device, from the first resource, a request to access the second resource, the request including the check and data identifying the first resource;
   authenticating, by a computing device, the check; and
   granting, by a computing device, the request to access the second resource only if the check is authentic and data identifying the first resource matches the data identifying the expected source associated with the check.

2. The method of claim 1, further comprising associating the check with expiration criteria and invalidating the check according to the expiration criteria, and wherein authenticating the check includes verifying that the check has not been invalidated.

3. The method of claim 1, further comprising associating the check with permission criteria and wherein granting the request to access the second resource includes granting limited access to the second resource according to the permission criteria.

4. In a computer network, a method for granting a request from a first resource to access a second resource, comprising:
   receiving, by a computing device, a request for a check, the request including data identifying the first resource;
   generating, by a computing device, a check;
   associating, by a computing device, the check with the data identifying the first resource;
   providing, by a computing device, the check to the first resource;
   the first resource signing the check with data identifying the first resource;
   the first resource submitting the signed check with a request to access the second resource;
   authenticating, by a computing device, the signed check; and
   granting, by a computing device, the request to access the second resource only if the check is authentic and is signed with data matching the data identifying the first resource associated with the check.

5. The method of claim 4, further comprising acquiring and authenticating user credentials before returning the check to the client.

6. The method of claim 4, wherein receiving a request for a check includes receiving a request for a check, the request including a public key for the first resource, and wherein the first resource signing the check with data identifying the first resource comprises the first resource signing the check with a private key for the first resource, the method further comprising, after granting access to the second resource, encrypting and decrypting communications sent between the first and second resources using the public and private keys.

7. The method of claim 4, further comprising associating the check with expiration criteria and invalidating the check according to the expiration criteria, and wherein authenticating includes verifying that the check has not been invalidated.

8. The method of claim 4, further comprising associating the check with permission criteria and wherein granting the request to access the second resource includes granting limited access to the second resource according to the permission criteria.

9. A Non-transitory computer readable storage media having instructions for:
   associating a check with data identifying an expected source of a future request to access the second resource;
   receiving, from the first resource, a request to access the second resource, the request including the check and data identifying the first resource;
   authenticating the check; and
   granting the request to access the second resource only if the check is authentic and data identifying the first resource matches the data identifying the expected source associated with the check.

10. The non-transitory computer readable storage media of claim 9, having further instructions for associating the check with expiration criteria and invalidating the check according to the expiration criteria, and wherein the instructions for authenticating include instructions for verifying that the check has not been invalidated.

11. The non-transitory computer readable media of claim 9, having further instructions for associating the check with permission criteria and wherein the instructions for granting the request to access the second resource include instructions for granting limited access to the second resource according to the permission criteria.

12. A Non-transitory computer readable storage media having instructions for:
   receiving a request for a check, the request including data identifying the first resource;
   generating a check;
   associating the check with the data identifying the first resource;
   providing the check to the first resource;
   directing the first resource to sign the check with data identifying the first resource;
   directing the first resource to submit the signed check with a request to access the second resource;
   authenticating the signed check; and
   granting the request to access the second resource only if the check is authentic and is signed with data matching the data identifying the first resource associated with the check.

13. The non-transitory computer readable storage media of claim 12, having further instructions for acquiring and authenticating user credentials before returning the check to the client.

14. The non-transitory computer readable storage media of claim 12, wherein the instructions for receiving a request for a check include instructions for receiving a request for a check, the request including a public key for the first resource, and wherein the instructions for directing the first resource to sign the check comprise instructions for directing the first resource to sign the check with the a private key for the first resource, and the media having further instructions for, after granting access to the second resource, encrypting communications sent to the first resource using the public key for the first resource.

15. The non-transitory computer readable storage media of claim 12, having further instructions for associating the check with expiration criteria and invalidating the check according to the expiration criteria, and wherein the instructions for authenticating include instructions for verifying that the check has not been invalidated.

16. The non-transitory computer readable storage media of claim 12, having further instructions for associating the check with permission criteria and wherein the instructions for granting the request to access the second resource include instructions for granting limited access to the second resource according to the permission criteria.

17. An authentication system used to grant a first resource's request to access to a second resource, comprising:
- One or more computing devices, wherein the computing devices grant the first resource's request to access to the second resource;
- a check writer operable to generate and associate a check with data identifying an expected source of a future request to access the second resource;
- a resource server operable to receive a request to access the second resource, the request including a check and data identifying the first resource;
- a check verifier operable to authenticate the check; and
- a gate keeper operable to grant the request only if the check is authentic and the data identifying the first resource matches the data identifying the expected source.

18. The system of claim 17, wherein the check writer is further operable to associate the check with expiration criteria, the system further comprising a check invalidator operable to invalidate the check according to the expiration criteria, and wherein the check verifier is further operable to authenticate the check by, at least in part, verifying that the check has not been invalidated.

19. The system of claim 17, wherein the check writer is further operable to associate the check with permission criteria and the gatekeeper is further operable to grant limited access to the second resource according to the permission criteria.

* * * * *

UNITED STATES PATENT AND TRADEMARK OFFICE
CERTIFICATE OF CORRECTION

| | | |
|---|---|---|
| PATENT NO. | : 7,941,840 B2 | Page 1 of 1 |
| APPLICATION NO. | : 10/373990 | |
| DATED | : May 10, 2011 | |
| INVENTOR(S) | : Ward Scott Foster et al. | |

It is certified that error appears in the above-identified patent and that said Letters Patent is hereby corrected as shown below:

In column 10, line 51, in Claim 14, delete "the a" and insert -- a --, therefor.

In column 11, line 3, in Claim 17, delete "One" and insert -- one --, therefor.

Signed and Sealed this
Fourth Day of October, 2011

David J. Kappos
*Director of the United States Patent and Trademark Office*